(12) United States Patent
Buchner et al.

(10) Patent No.: US 6,309,774 B1
(45) Date of Patent: Oct. 30, 2001

(54) LIQUID-COOLED FUEL CELL BATTERY

(75) Inventors: Peter Buchner, Heiligenstadt; Rittmar Von Helmolt, Erlangen; Manfred Waidhas, Nürnberg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,726
(22) PCT Filed: Nov. 26, 1997
(86) PCT No.: PCT/DE97/02766
§ 371 Date: May 21, 1999
§ 102(e) Date: May 21, 1999
(87) PCT Pub. No.: WO98/24138
PCT Pub. Date: Jun. 4, 1998

(30) Foreign Application Priority Data

Nov. 29, 1996 (DE) ............................................... 196 49 691

(51) Int. Cl.[7] ..................................................... H01M 2/14
(52) U.S. Cl. .................................. 429/38; 429/26; 429/39; 429/120
(58) Field of Search .................................. 429/38, 39, 34, 429/26, 120, 13, 6

(56) References Cited

U.S. PATENT DOCUMENTS

| | | | | |
|---|---|---|---|---|
| 4,416,956 | * | 11/1983 | Lawless | 429/15 |
| 4,973,530 | * | 11/1990 | Vanderbogh et al. | 429/13 |
| 5,206,094 | * | 4/1993 | Katz | 429/26 |
| 5,470,671 | * | 11/1995 | Fletcher et al. | 429/26 |

* cited by examiner

*Primary Examiner*—Stephen Kalafut
*Assistant Examiner*—Raymond Alejandro
(74) *Attorney, Agent, or Firm*—Schiff Hardin & Waite

(57) ABSTRACT

The invention is directed to a battery with liquid cooling composed of at least two fuel cells that respectively comprise a negative pole plate, a membrane electrode unit and a positive pole plate that are connected to one another mechanically rigidly, gas-tight and electronically insulating by a frame element, whereby the battery is immersed into a coolant bath.

6 Claims, 2 Drawing Sheets

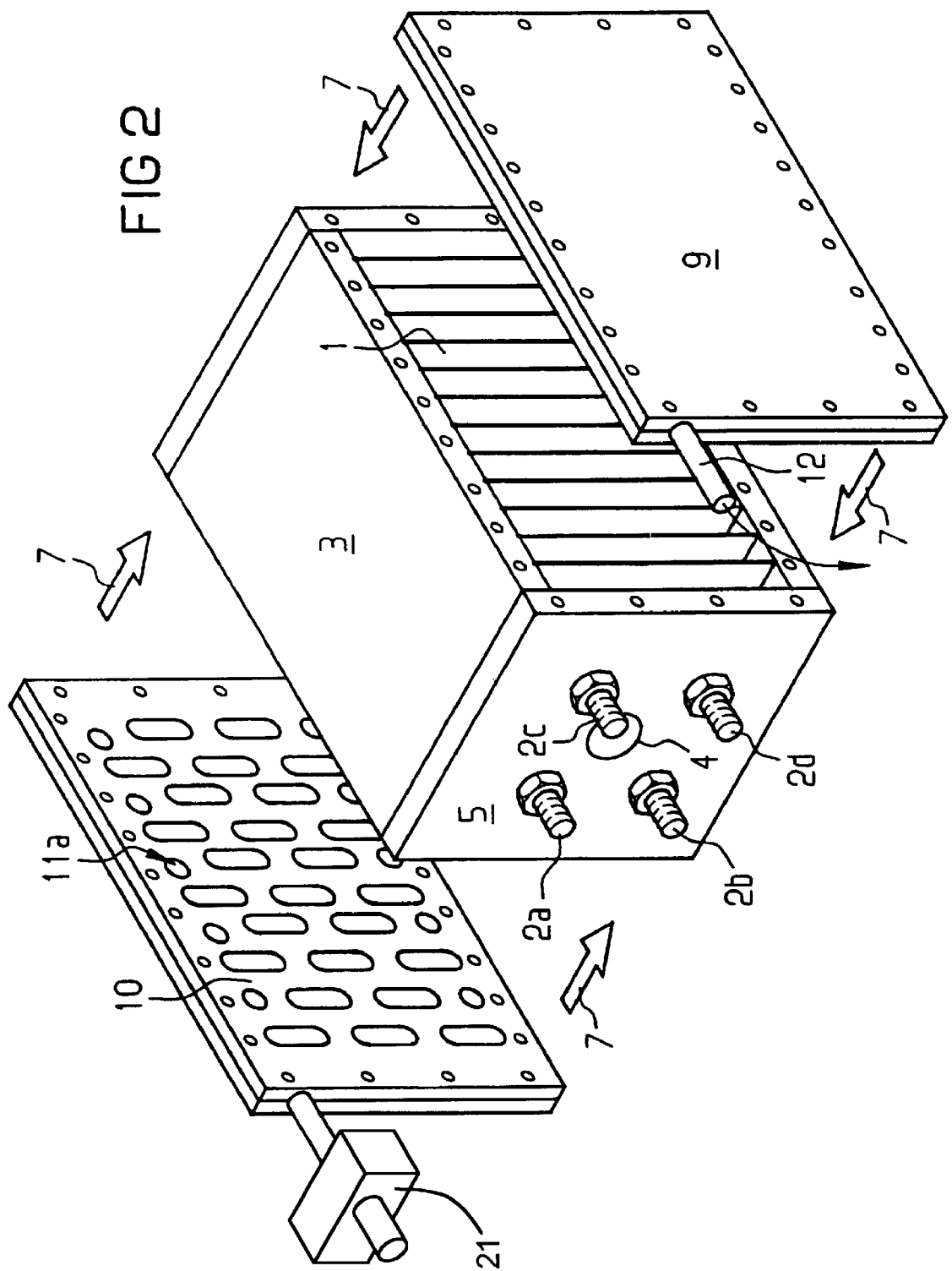

LIQUID-COOLED FUEL CELL BATTERY

BACKGROUND OF THE INVENTION

1. Field of the Invention

The invention is directed to a battery composed of at least two fuel cells that respectively comprise a negative pole plate, a membrane electrode unit and a positive pole plate that are connected to one another in a mechanically rigidly, gas-tight and electronically insulating manner by a frame element.

2. Description of the Related Art

Up to now, such batteries wherein every fuel cell of the battery respectively has a negative and a positive pole plate are disclosed, for example, by German Letters Patent 44 42 285; however, the problem of liquid cooling of such fuel batteries has not yet been solved. A liquid coolant is desirable for stationary applications wherein the waste heat is to be utilized in order to keep the required heat exchanger and the distribution of the heat compact.

Liquid-cooled fuel cell batteries are known that, however, respectively contain only individual contact or pole plates at the positive and at the negative end of the battery. Within the battery, these individual contact or pole plates are replaced by what are referred to as bipolar plates, which are often fashioned hollow. The liquid coolant of the known liquid-cooled batteries is located in the cavities of the bipolar plates. Previously known bipolar plates adjoin, on the one hand, the anode space and, on the other hand, the cathode space of the individual fuel cells to be connected to one another. When a traditional battery is assembled, the bipolar plates are stacked on top of one another with the membrane electrode units of the individual fuel cells and are mechanically joined to one another by screw bolts, tie rods or other clamp devices. A single pole or contact plate is then respectively located at the end. This system is also referred to as filter press technique (see, for example, W. Vielstich from "Brennstoffelemente", Verlag Chemie GmbH, pages 171 and 201/202).

A significant disadvantage of filter press technique is that very high demands must be made of the edge seals of the fuel cell battery because the respective reaction agents, i.e. oxidant, fuel and coolant, must be reliably sealed from one another. Up to now, for example, an especially ticklish, direct sealing without buffer area that must assure that oxidant and fuel cannot overflow into one another is required at the edges of the bipolar plates. It is self-evident that such demands made of the edge seals are reflected in the manufacturing costs of the batteries. There is therefore a need to overcome the previously known filter press technique, not only given air-cooled fuel cells as in the above-cited German Letters Patent 44 42 285, but also given liquid-cooled fuel cell batteries.

SUMMARY OF THE INVENTION

It is therefore an object of the present invention to make a liquid-cooled battery of fuel cells available that is designed without direct edge sealing between cathode and anode space.

The general perception of the invention is that this is possible given employment of individual sealing of the fuel cell units of a battery disclosed by German Letters Patent 44 42 285 when a battery manufactured therefrom is immersed into a coolant bath.

The subject matter of the invention is a battery with liquid cooling composed of at least two fuel cells that respectively comprise a negative pole plate, a membrane electrode unit and a positive pole plate that are connected to one another mechanically rigidly, gas-tight and electronically insulating by a frame element, whereby the battery is immersed into a coolant bath.

A further subject matter of the present invention is a method for cooling a fuel cell battery, whereby the battery is cooled by immersion into a coolant bath.

In one embodiment of the invention and of the inventive method, the battery is completely immersed into a coolant bath.

In an advantageous development of the invention, the container for the coolant bath is integrated such in the battery housing that the battery housing itself is no longer surrounded by liquid coolant.

The electrolyte membrane, which is the heart of the membrane electrode unit of the fuel cell, extends up to the edge of the cell and could be washed out given employment of water as coolant. It is therefore provided in an advantageous development of the invention that it is not water but a hydrophobic, i.e. water-repellant coolant (for example, oil or transformer oil that does not wet the membrane that is employed. Alternatively to this advantageous embodiment, the electrolyte membrane can be prevented from being washed out by water as coolant in that a seal as offered, for example, by the Gore company in conjunction with the membrane electrolyte unit and that precludes this washing effect is employed in the individual sealing of the membrane electrode unit by the frame element. The costs of a battery constructed in this way nonetheless still lie below the costs for the seals of the known bipolar plates.

It is advantageous when the coolant flows through the coolant bath. The flow can thereby be effected solely by convection. As needed, the flow can also be generated by a pump or the convection can be intensified by a pump.

It is advantageous when the flow existing in the coolant bath is regulated such that it is uniformly distributed over the entire fuel cell battery. This can occur via a coolant distributor.

In an advantageous development of the method, the flow velocities and/or the flow distribution of the coolant in the coolant bath can be regulated. This is especially practical when the battery is intended to meet different power demands and has a differing cooling need over time as a result thereof.

What is referred to here as "battery" is an aggregate or stack of at least two series-connected, individual fuel cells. One possible application of such a battery is, for example, decentralized power generating wherein aggregates having a far higher plurality of individual fuel cells are employed. For example, a battery must produce a power of approximately 10 kW for employment in a household energy supply system for a single-family house. Given an assumed cell area of approximately 300 cm$^2$ and a power of approximately 100 Watts per individual fuel cell, a battery employable therein comes out to about 100 individual cells.

The fuel cells that are disclosed in the above-cited German Letters Patent 44 42 285 are preferably referred to here as "individual fuel cell" or "fuel cell unit". The full content of this Letters Patent is herewith referenced and the entire disclosure thereof is included in the subject matter of the present specification. Said fuel cells are units that can be individually handled and that respectively comprise a negative pole plate, a membrane electrode unit and a positive pole plate, whereby the aforementioned component parts are connected to one another mechanically fairly, gas-tight and electronically insulating by a respective frame element.

What is referred to here as "membrane electrode unit" is a membrane respectively having a negative and a positive electrode. All such units that are standard in this technology are included under the term "membrane electrode unit". The electrodes preferably do not extend up to the edge of the membrane but leave an edge area of the membrane free, so that a frame element of the fuel cell embraces only the positive and negative pole plate of the fuel cell as well as the membrane itself.

What is fundamentally referred to as "frame element" is that part that is suitable for connecting at least negative pole plate, membrane and positive pole plate and, potentially, the electrodes or other component parts of the fuel cell as well to one another mechanically firmly, gas-tight and electronically insulating. The frame element can be composed of one piece; however, it can also be composed, for example, of a plurality of parts. The frame element preferably has a U-profile cross section, whereby the two U-legs press the two pole plates together with the membrane and thus close off the inside of this unit gas-tight from the penetration of gasses. The frame element corresponds to the frame element that was disclosed in the afore-mentioned German Letters Patent 44 42 285.

Each of the fuel cells preferably has at least four through supply and waste disposal openings that are respectively connected to one another within a battery.

When stacking at least two inventive fuel cells to form a battery, a direct mechanical and electronic contact of the negative pole plate of the one fuel cell with the positive pole plate of the next fuel cell preferably derives. The two cells are thus electrically connected in series. When present, the direct mechanical and electronic contact occurs along the four supply and waste disposal openings. The negative and positive pole plates of the two fuel cells adjoining one another are thereby shaped such that an interspace or cavity through which coolant can flow remains between the completely stacked fuel cells that are in direct mechanical and electronic contact.

Upon immersion of the battery or of the fuel cell stack into a coolant bath, for example, the coolant flows through these cavities. The flow of the liquid coolant then proceeds analogous to the air stream in the mainly air-cooled version of a fuel cell battery that is known from the above-cited Letters Patent.

The flow velocity in the coolant bath can be regulated via a pump. Given fluids with high heat capacity, a slight flow velocity already suffices in order to achieve a good cooling effect. Turbulences that are generated in the stream of the coolant are advantageous because the heat capacity of the coolant, which is not substrate-specific, is thus increased. In this context, the application having Ser. No. 19635901.5 is referenced, the technical teaching thereof being suitable for employment in the scope of the present invention.

The flow distribution can be regulated by a coolant distributor that is attached to the admission of the liquid coolant and that divides the uniform stream of coolant at the admission. The coolant distributor serves the purpose of uniformly supplying the fuel cell battery with coolant.

The flow velocity of the coolant within the liquid and coolant bath can be regulated by the pump and the flow distribution.

What is meant by "hydrophobic" is the property of a medium to have a water-repellant effect. All the coolants that do not dissolve in water, i.e. are not suitable for wetting the water-saturated membrane and thereby washing it out, are understood by a hydrophobic coolant The pump with which the flow of the coolant is potentially intensified can be an arbitrary pump with which the liquid can be suctioned in, placed under pressure or compressed such that a flow arises. The arrangement of the pump in the overall system is arbitrary and can both precede as well as follow the actual coolant bath.

The coolant bath is situated in a liquid-light container. This is preferably provided with at least two permanent openings, one at the admission and one at the discharge of the coolant. However, it can comprise many openings; a coolant distributor is then usually superfluous.

In an embodiment, the present invention provides a liquid cooled battery that comprises at least two fuel cells, each fuel cell comprising a negative pole plate, a membrane electrode unit and a positive pole plate. The fuel cells are connected to one another by a mechanically rigidly, gas type in an electronically insulating manner by a frame element. The frame element accommodates a coolant bath in which the cells are at least partially immersed. The frame element further comprises a coolant inlet and a coolant outlet whereby coolant flows through the coolant inlet, around the fuel cells and out the coolant outlet.

In an embodiment, the fuel cells are completely immersed in the coolant bath.

In an embodiment, the coolant is a hydrophobic coolant.

In an embodiment, the battery further comprises a pump for pumping coolant through the frame element.

In an embodiment, the frame element further comprises a coolant distributor connected to the coolant inlet.

In an embodiment, the frame element further comprises two opposing sidewalls. The fuel cells are sandwiched between the two opposing side walls. One of the sidewall comprises a coolant inlet as well as a coolant distributor and the other of the sidewalls comprises a coolant output.

In an embodiment, the present invention provides a method for cooling a cell fuel battery that comprises the steps of providing a battery as described above, and providing a flow of coolant through the coolant inlet, around the fuel cells and out the coolant outlet.

Other objects and advantages of the present invention will become apparent from reading the following detailed descriptions and appended claims, and upon reference to the accompanying drawings.

BRIEF DESCRIPTION OF THE DRAWINGS

FIG. 2 illustrates the embodiment of the inventive battery wherein the flow in the coolant bath is distributed via a coolant distributor.

Figure 1:
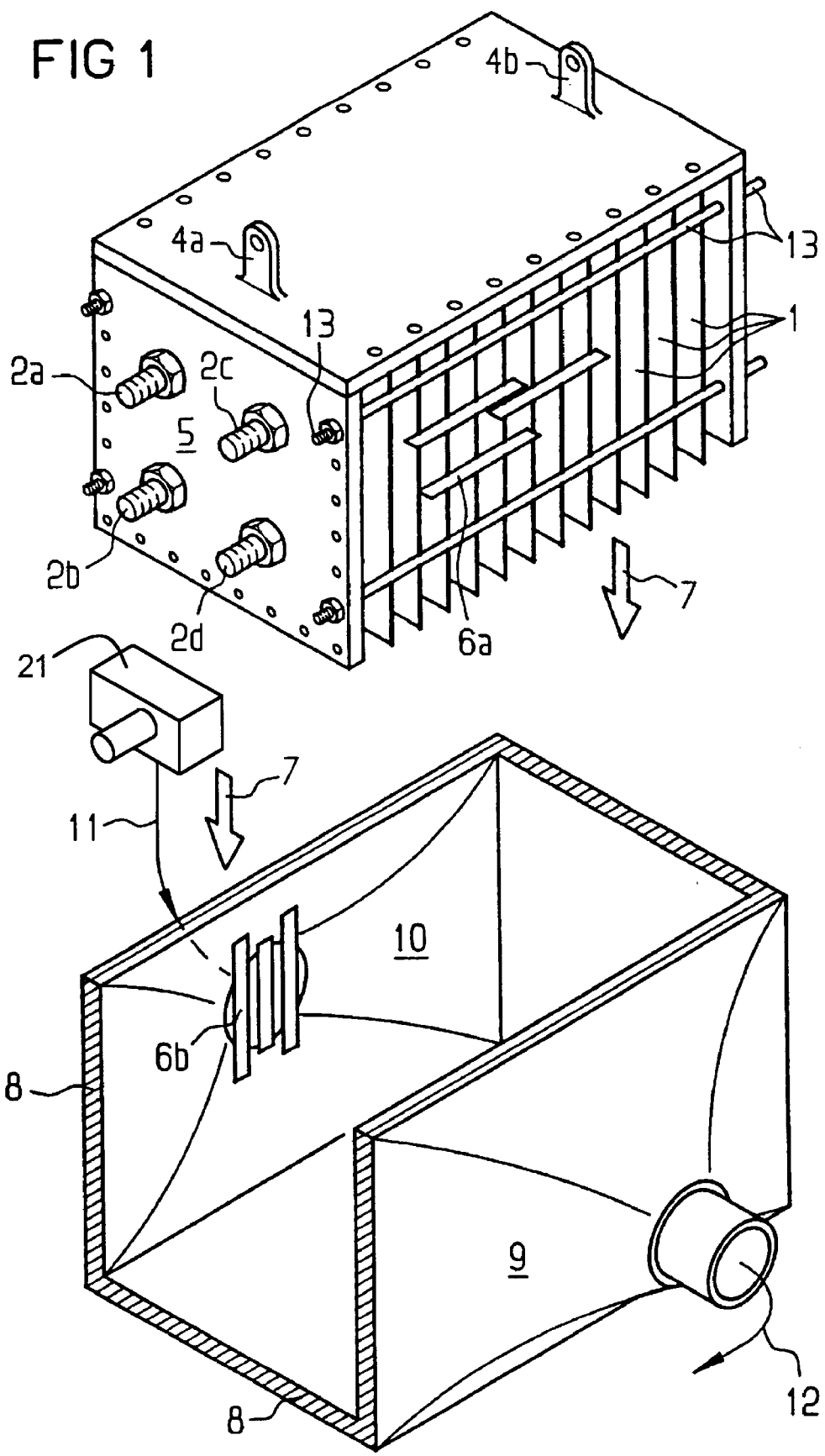
FIG. 1 illustrates the embodiment of the inventive battery wherein the container for the coolant bath is integrated into the battery housing.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course that the invention is not necessarily limited to the particular embodiments illustrated herein.

FIG. 1 shows the illustration of an inventive battery composed of a stack of individual fuel cells 1 respectively forming a unit that can be handled, this having four through supply or waste disposal openings 2a, 2b, 2c and 2d. The battery is surrounded by a six-sided, cuboid-shaped battery housing. FIG. 1 shows the battery before assembly, the direction thereof being indicated by the arrows 7. The assembly can ensue with any fluid-tight connection of the two parts.

The upper side 3 (FIG. 2) of the battery housing with the two current taps 4a and 4b as well as the side 5 of the battery housing with the end and supply openings 2a through 2d can be seen in the upper half of FIG. 1. The stack of fuel cells 1 is held together, for example, by screw closures or tie rods 13 that, again by way of example, are adjusted via a screw thread at the upper side 3 and the underside (not shown). The end 5 and supply openings 2a through 2d are connected to axial channels that extend over the entire cell stack During operation of the battery, the oxidant, for example, is delivered via the supply opening 2b and is then conducted through the adjoining axial channel through the entire fuel cell stack of the battery, having respective openings to the individual cathode spaces. The oxidant consumed in the individual cathode spaces of the battery can in turn leave the cell stack through the waste disposal opening 2C via the likewise through waste disposal channel. In the aforementioned example, the fuel is then correspondingly supplied via the supply opening 2a and eliminated via the waste disposal opening 2d.

The diffusors 6a with whose assistance the coolant can be distributed in the coolant bath are shown transverse to the cell stack The attachment of the diffusers is not absolutely required but can be contained in the battery or not respectively as needed and dependent on the embodiment of the invention.

Upon assembly of the battery, the upper half of FIG. 1 is plugged into the lower half of FIG. 1, as indicated by the arrows 7, whereby the edges of sides 3 and 5 of the battery housing meet the seal surface 8 along the adjoining edges of the battery housing that is shown in the lower half of FIG. 1. The seal surface 8 assures that the container is liquid-tight.

The admission opening 11 and the discharge opening 12 of the coolant can be seen at the two sides 9 and 10 of the liquid container and battery housing. Either the admission opening 11 or the discharge opening 12 may be connected to a coolant pump 21. Imnediately adjoining the admission opening 11, the battery housing has more diffusers 6b that reside transverse to the diffusors 6a that are shown in the upper half of FIG. 1. As already mentioned, the diffusors 6a help for uniform distribution of the coolant in the coolant bath. The attitude of the diffusors 6a is thereby arbitrary and FIG. 1 shows an exemplary arrangement.

The fat that the battery is shown as cuboid and, thus, six-sided in both FIGS. 1 and 2 merely serves for simplification and illustration of the inventive battery. This development is in fact a preferred embodiment, but the invention is definitely not limited to this shape of the battery, on the contrary, it can also cover all types of batteries in different geometrical shapes.

FIG. 2 shows a development of the invention with a coolant distributor. The coolant distributor is thereby integrated such in the battery housing that a more compact structure is achieved. The middle of FIG. 2 again shows the stack of individual fuel cells 1 with which the battery is constructed. One can likewise see the front surface 5 of the battery housing with the four waste disposal and supply openings 2a, 2b, 2c and 2d through which the reaction gasses are conducted through the fuel cell stack and through which the consumed reaction gasses are eliminated from the battery cell stack The current tap 4 is likewise situated at the side 5 of the cuboid and, therefore, six-sided battery.

At its edge directed toward the front, the side 10 of the battery shows the coolant admission opening 11. A coolant distributor is integrated such into tis side 10 of the battery shown in FIG. 2 that the coolant flows into the fuel cell stack 1 through the various openings 1a that are located at the inside at this side. The openings 11a of the distributor are designed such that the coolant experiences an optimally uniform distribution along the entire fuel cell stack At its outwardly directed edge, side 9 of the battery shown in FIG. 2 again exhibits the coolant discharge opening 12 through which the used coolant in turn leaves the coolant bath in which the battery is immersed. The inside of the side 9 of the inventive battery housing that is shown in FIG. 2 cannot be seen and this, byway of example and not necessarily, has the same distribution of openings 11a, which serve as outlet, as the side 10. Finally, how the battery is assembled is also indicated in FIG. 2 by the four arrows 7.

It should be reemphasized that the FIGS. 1 and 2 merely describe preferred embodiments of the inventive battery and are definitely not intended to limit the scope of the application, particularly with respect to their geometrical illustration, which is highly simplified. On the contrary, the present invention is not bound to any kind of geometrical fashioning but is quite generally applicable to batteries composed of fuel cells wherein the individual fuel cells represent units that can be individually handled and that can be adequately cooled by immersion into a coolant bath, potentially with appertining flow of the liquid located in the coolant bath. In particular, the inventive battery can forego the especially problematical seals between cathode and anode space, as already mentioned above.

Inventively, the battery housing or the coolant bath into which the battery is partly or completely immersed for cooling is fashioned such that a testing of the fuel cell stack as well as a testing of the individual gas conduits is possible during operation, i.e. given ongoing cooling, so that, for example, faulty cells or leaks can be found and the faults can be eliminated while the battery is in the coolant bath. Since all seals of the reaction gas spaces in the above-cited German Letters Patent 44 42 285 lead into the exterior space, which represents the coolant bath in this case, namely, all gas leaks can be easily detected on the basis of the emerging gas bubbles. Since the cells can be made individually easily accessible in the disclosed battery design, there is also a possibility of detecting faulty cells on the basis of a simple voltage measurement.

From the above description, it is apparent that the objects of the present invention has been achieved. While only certain embodiments have been set forth, alternative embodiments and various modifications will be apparent from the above descriptions to those skilled in the art. These and other alternatives are considered equivalents and within the spirit and scope of the present invention.

What is claimed is:

1. A liquid cooled battery comprising:
    at least two fuel cells, each fuel cell comprising a negative pole plate, a membrane electrode unit and a positive pole plate,
    a frame element connecting the fuel cells to one another with a mechanically rigid and gas-tight connection with each cell being electronically insulated from the other cells,
    the frame element accommodating a coolant bath in which the fuel cells are at least partially immersed, the frame element having a coolant inlet and a coolant outlet, and
    a pump for pumping the coolant into the coolant inlet, around the fuel cells and out the coolant outlet with the frame element working as a distributor for the coolant being pumped by the pump.

2. The battery according to claim 1, wherein the fuel cells are completely immersed in the coolant bath.

3. The battery according to claim 1, wherein the coolant is a hydrophobic coolant.

4. A liquid cooled battery comprising:

at least two fuel cells, each fuel cell comprising a negative pole plate, a membrane electrode unit and a positive pole plate, a frame element connecting the fuel cells to one another with a mechanically rigid and gas-tight connection with each cell being electronically insulated, the frame element comprising two opposing sidewalls, the fuel cells being sandwiched between the two opposing side walls, the frame element defining a coolant bath in which the fuel cells are at least partially immersed, one of the opposing sidewalls of the frame element comprising a coolant inlet and a coolant distributor, and the other of the sidewalls of the frame element comprising a coolant outlet; and a pump connected to the coolant inlet for pumping coolant through the frame element so that coolant flows through the coolant inlet through the coolant distributor, around the fuel cells and out the coolant outlet.

5. The battery according to claim 4, wherein the fuel cells are completely immersed in the coolant bath.

6. The battery according to claim 4, wherein the coolant is a hydrophobic coolant.

\* \* \* \* \*